V. AMBRUS.
WATER GATE.
APPLICATION FILED MAY 29, 1920.
1,354,869. Patented Oct. 5, 1920.
2 SHEETS—SHEET 2.
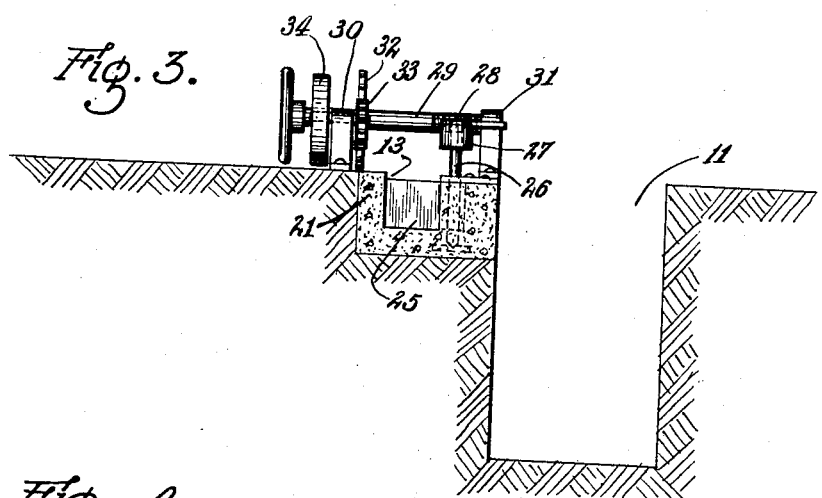
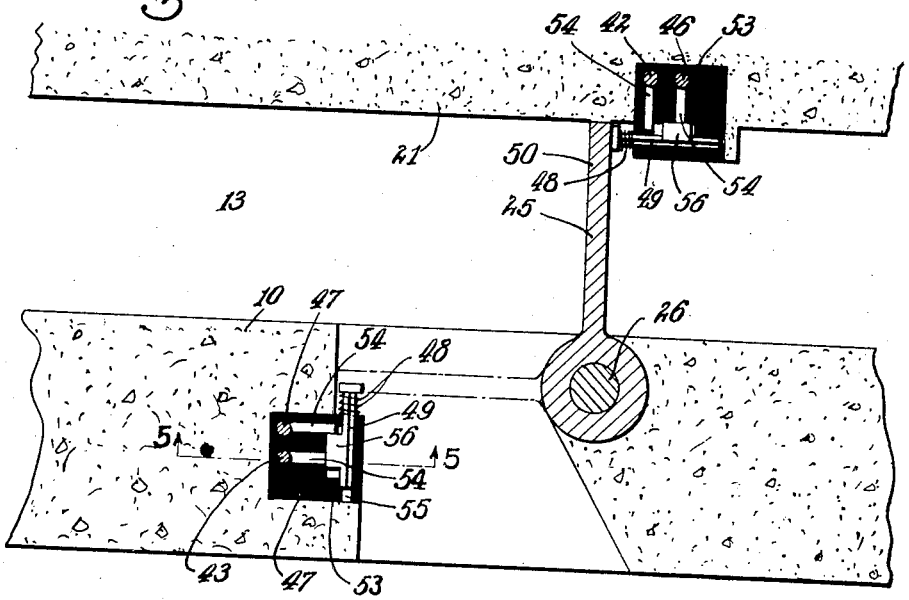
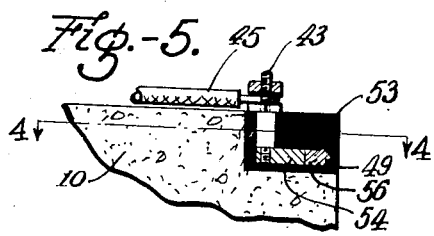
INVENTOR
Vendel Ambrus
BY
Harry Jacobson
ATTORNEY

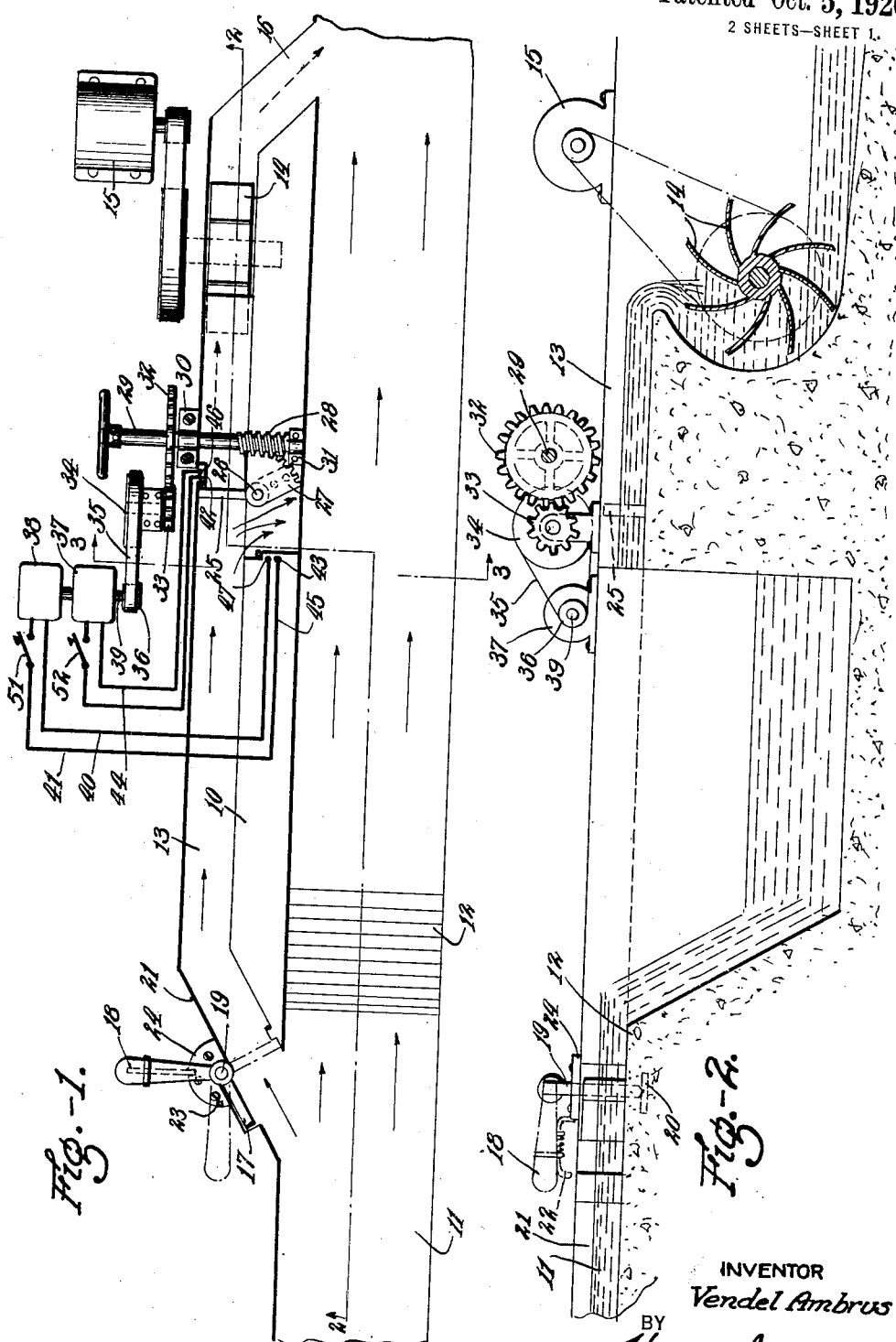

UNITED STATES PATENT OFFICE.

VENDEL AMBRUS, OF MILWAUKEE, WISCONSIN.

WATER-GATE.

1,354,869.   Specification of Letters Patent.   Patented Oct. 5, 1920.

Application filed May 29, 1920. Serial No. 385,145.

*To all whom it may concern:*

Be it known that I, VENDEL AMBRUS, citizen of Hungary, residing at Milwaukee, in the county of Milwaukee and State of Wisconsin, have invented certain new and useful Improvements in Water-Gates, of which the following is a specification.

This invention relates generally to water gates, having now particular reference to the controlling mechanism therefor, and has for one of its objects the provision of means for operating a gate, which means are automatically rendered inoperative when the gate reaches the desired position.

Other objects will appear from the description which follows when read in connection with the accompanying drawings, in which, Figure 1 is a top view of a water power plant embodying my invention.

Fig. 2 is a vertical section of the same on line 2—2 of Fig. 1.

Fig. 3 is an enlarged vertical section on line 3—3 of Fig. 1.

Fig. 4 is a horizontal section approximately on line 4—4 of Fig. 1.

Fig. 5 is a vertical section on line 5—5 of Fig. 4.

Referring particularly to Figs. 1 and 2, the stream 11 is obstructed by the dam 12 of the usual type, whereby the necessary head of water is provided, the canal 13 conducting the water to the power generating mechanism such as the water wheel 14 operatively connected to the electric generator 15. The water, after performing its work, is discharged into the tail race 16, through which it returns to that portion of the stream below the dam, in the usual manner. A suitable overflow gate 17 is situated at the entrance to the canal 13, said gate being manipulated in any convenient manner, as by the handle 18, attached to the vertical gate pivot 19, which rests on bearing plate 20 in the canal wall 21. The height of the top of gate 17 is such that the water level in canal 13 is maintained under normal conditions at the proper elevation to run the machinery without danger of damage or of overflowing the banks of the canal. When, however, the stream 11 carries down an unusual volume of water which tends to flow into canal 13 and cause undesirable operating conditions, the amount of water discharged over the top of gate 17 may not be sufficient to relieve the condition, and in such event it is advantageous to swing said gate about its pivot 19 into the thread of the canal stream, thereby limiting the quantity of water flowing into said canal, or entirely shutting off the flow if necessary, in which case the surplus water is discharged over the top of dam 2 into the bed of the stream and behind gate 17 into a suitable overflow conduit provided for that purpose. A spring catch 22 attached to handle 18 is arranged to engage notches 23 in plate 24 for holding said gate in the desired position.

To cut off the supply of water from water wheel 14 entirely, to stop the rotation thereof, a second gate 25, mounted on vertical shaft 26 and placed near said wheel 14, is provided, said gate being arranged to be swung across the canal 13 as shown in Fig. 1 to its closed position and to be swung back flush with canal wall 10 into its open position to allow free flow of the water in said canal.

The operating mechanism for gate 25 comprises the segmental gear 27 mounted on the upper end of shaft 26, said gear being driven by worm 28 on shaft 29 supported in bearings 30 and 31. A gear 32 on said shaft 29 meshes with gear 33, which is driven by pulley 34 on the same shaft therewith through belt 35 passing around pulley 36. Power is supplied independently to each of electric motors 37 and 38 to cause the direction of rotation of one to be opposite to that of the other, said motors being mounted on the same shaft 39 on which pulley 36 is mounted. Wires 40 and 41 supply the power from a source not shown, the ends of said wires being each connected respectively to terminals 42 in canal wall 21 and terminal 43 in canal wall 10, said terminals being each arranged at points adjacent to the positions in the canal walls assumed by the outermost edge 50 of gate 25 in its closed and in its open position.

Return wire 44 leads from terminal 46 in wall 21 back to motor 37, while return wire 45 leads from terminal 47 in wall 10 back to motor 38, said motors being designed to rotate in opposite directions. Switches 51 and 52, interposed along wires 41 and 40 respectively are normally open, except when it is desired to swing gate 25 from one position to the other position.

Means are provided to break the circuit between terminals in the same wall when the gate 25 is in its fully opened or in its fully closed positions, so that the edge 50 of said gate comes into contact with the canal wall in which the pair of terminals is mounted. The circuit breaking devices being identical in construction, a description of one will suffice for both. Referring to Figs. 4 and 5, the terminals above mentioned are insulated from the canal walls by being set into block 53 of insulating material, each terminal being connected to a horizontal contact piece 54. A contact slide 49, having a shoulder 56 thereon engaging pieces 54, moves in groove 55 of block 53 when impelled thereto by the action of gate 25, against the resistance of spring 48, in which event it is withdrawn from one of the contact pieces 54 and the circuit is broken.

If, for instance, it is required that the gate be opened (Figs. 1 and 4) switch 51 is closed, thereby starting motor 38, and operating the segmental gear 27 in a counter clockwise direction to swing the gate against wall 10. As the edge 50 of the gate 25 approaches its final open position it comes in contact with the head of contact slide 49 and operates said slide against the action of spring 48 to disconnect said slide from terminal 47, so that even though the switch 51 remains closed, no further motion of gate 25 in the same direction can take place to cause damage. After said gate has reached its final position, the switch 51 is again opened. In the meanwhile, the contact slide 49 in wall 21 has reconnected terminals 42 and 46 so that the closing of switch 52 now operates motor 37 to turn the gate in the opposite direction and bring it back to the closed position, when the electric circuit is again broken as above described and the connection between terminals 47 and 43 reëstablished by the action of spring 48. It will be obvious that the engagement of gear segment 27 with worm 29 will act to hold the gate against movement when the circuit is broken.

A hand wheel 57 is mounted on shaft 29 to operate gates 25 in an emergency as when the operating motors should get out of order. It will be understood that various changes may be made in the plant as described above without departing from the spirit of my invention, as for instance the substitution of starting boxes of the usual type for the switches 51 and 52.

What I claim is:

In a water power plant a gate, a vertical pivot for said gate, electrically driven means for rotating said gate about said pivot and means for rendering said rotating means inoperative when the gate reaches the end of its rotative movement comprising a pair of separated terminals, forming part of the electric circuit to said rotating means, and a spring pressed slidable contact piece normally in contact with both of said terminals and being adapted to be moved by said gate out of contact with one of said terminals when the gate reaches the desired position at the end of its swing.

In testimony whereof I have affixed my signature this 24th day of May, 1920.

VENDEL AMBRUS.